Figure 1:
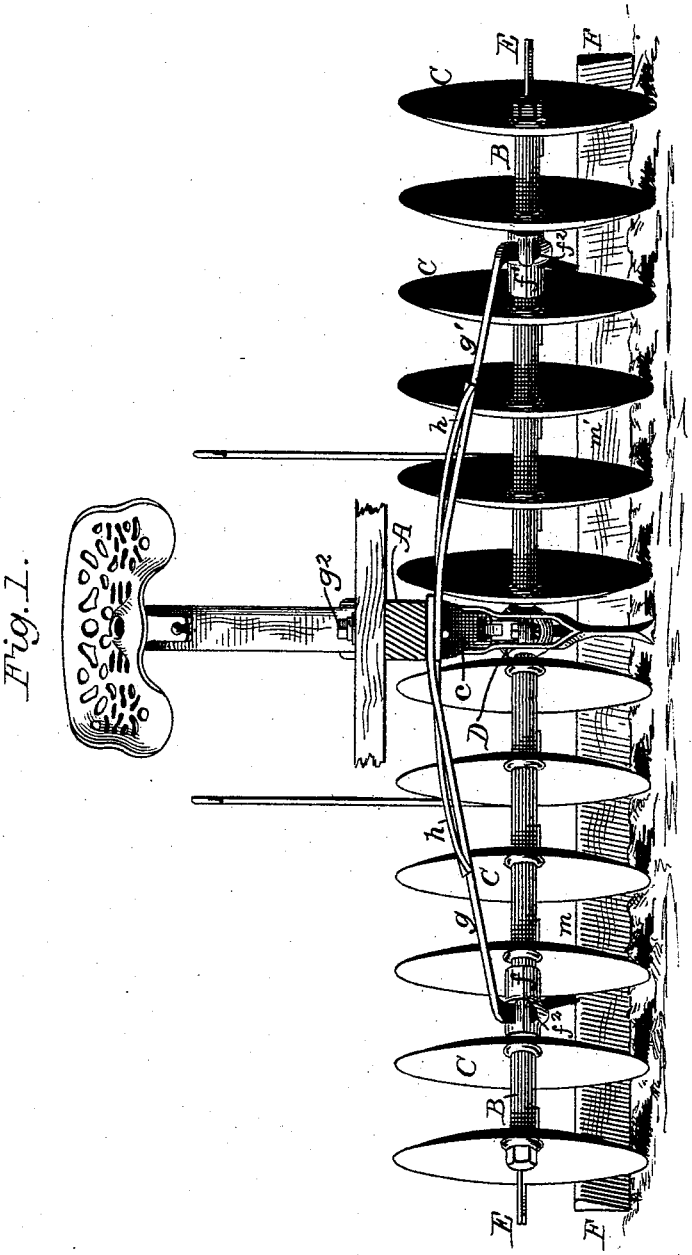

(No Model.)  G. M. CLARK.  6 Sheets—Sheet 1.
DISK HARROW.

No. 444,662.  Patented Jan. 13, 1891.

Witnesses
Philip F. Larner.
Howell Bartle.

Inventor
George Marshall Clark.
By his Attorney Wm. C. Wood (No Model.) 6 Sheets—Sheet 2.
G. M. CLARK.
DISK HARROW.
No. 444,662. Patented Jan. 13, 1891.
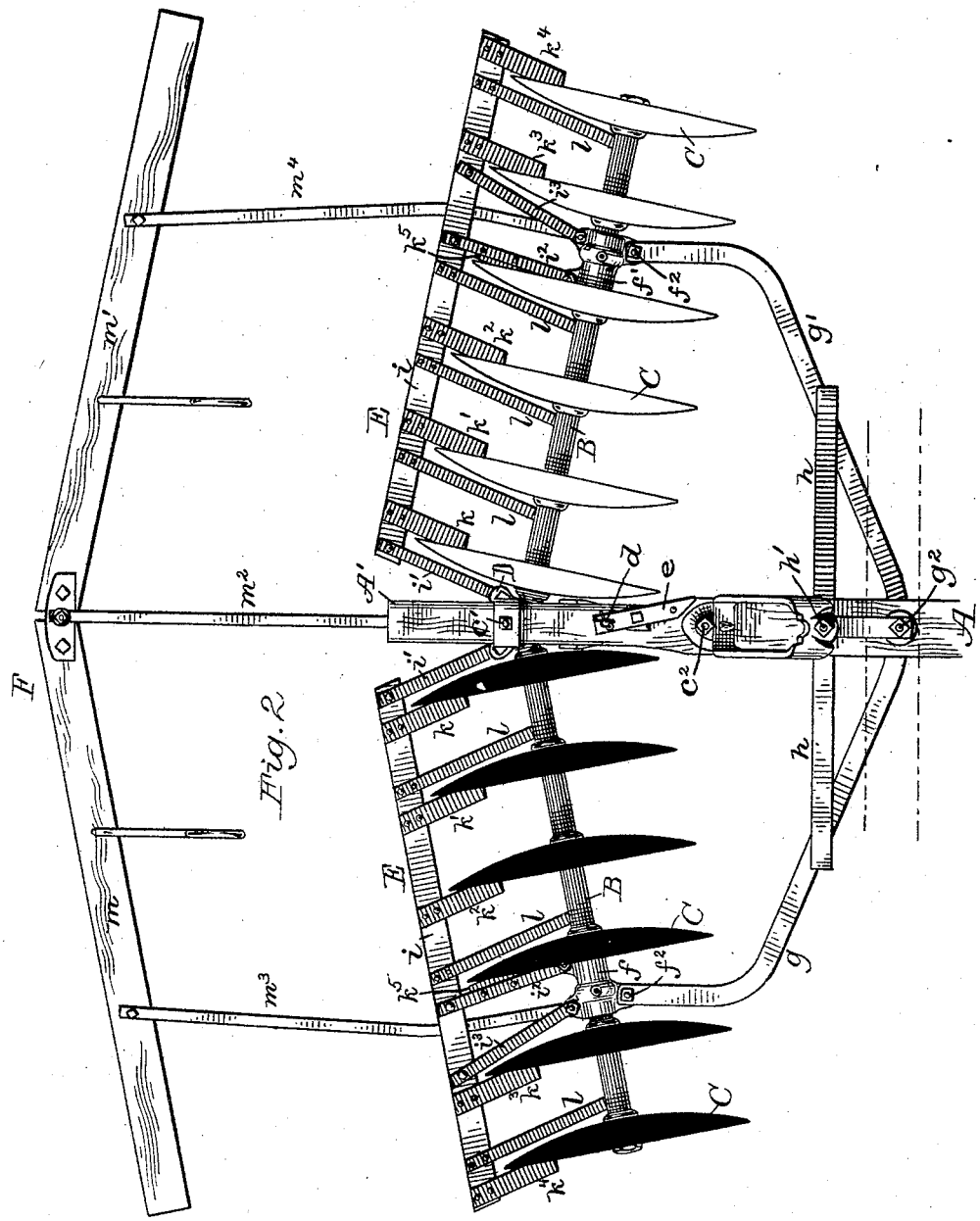
Witnesses
Philip F. Larner.
Howell Bartle.
Inventor
George Marshall Clark.
By his Attorney Wm C Wood

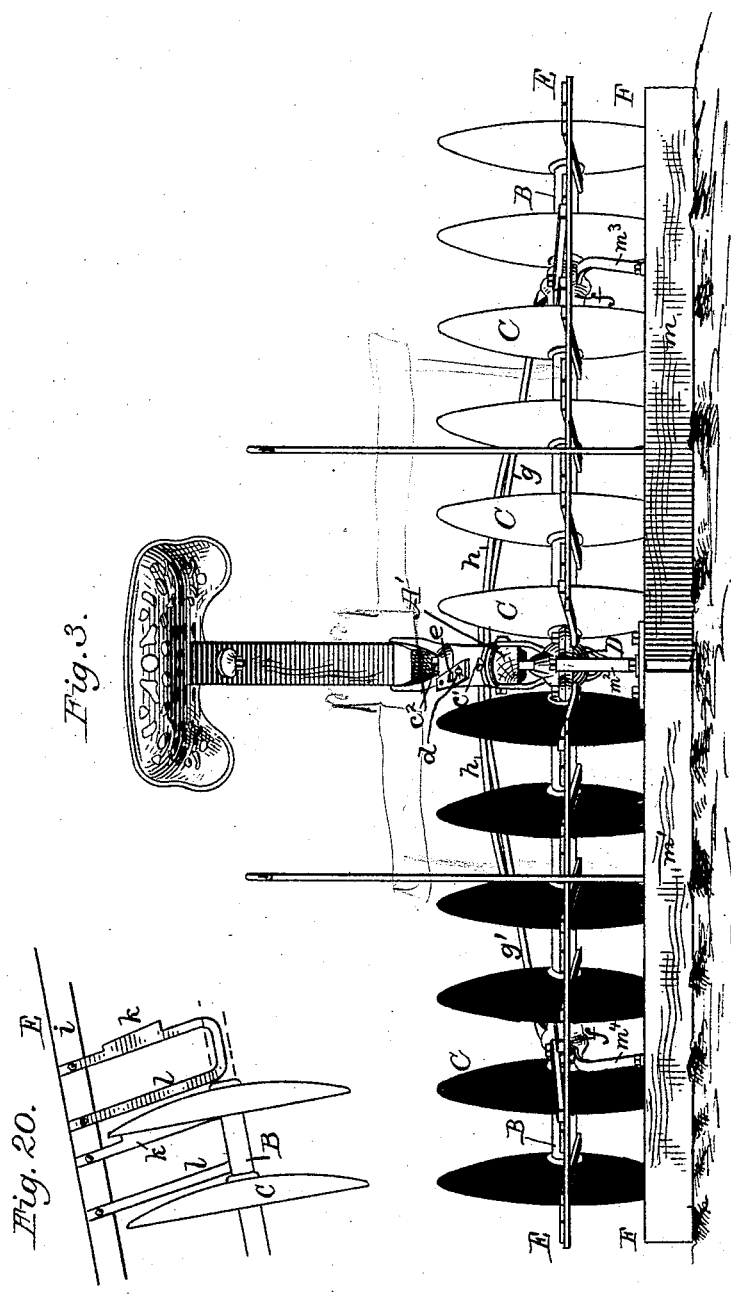

(No Model.) 6 Sheets—Sheet 4.
G. M. CLARK.
DISK HARROW.
No. 444,662. Patented Jan. 13, 1891.
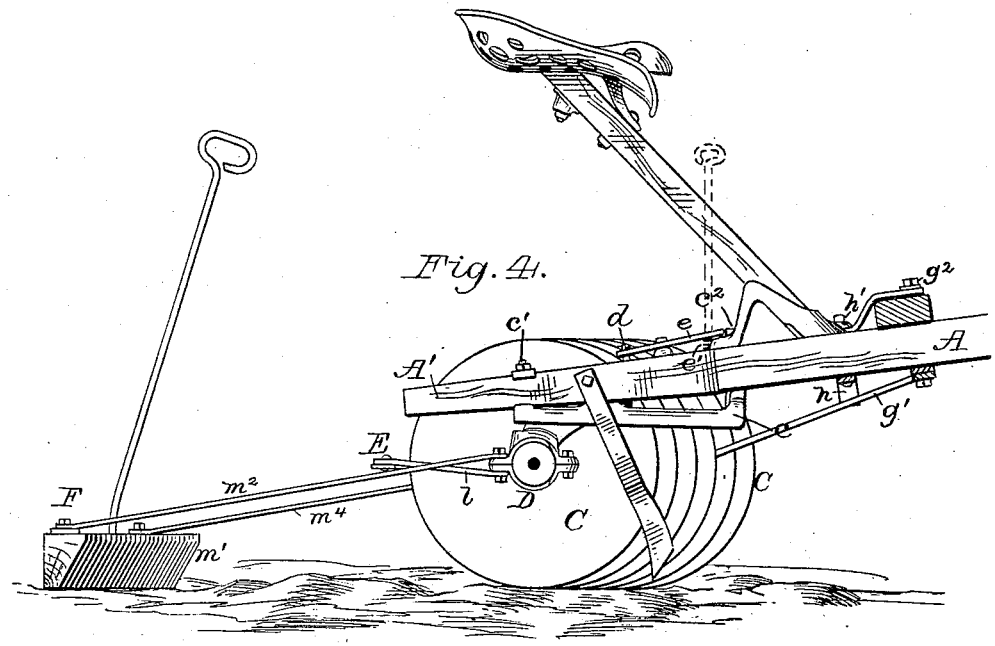
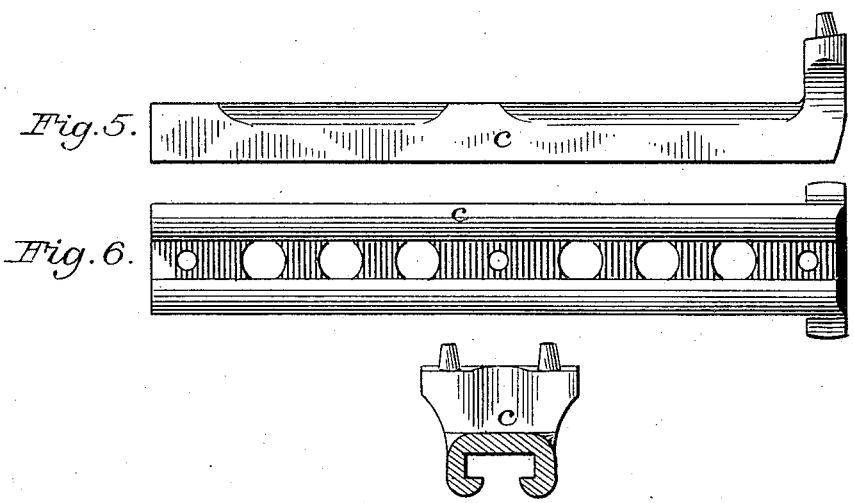
Witnesses
Philip F. Larner
Howell Bartle
Inventor
George Marshall Clark.
By his Attorney Wm C Wood (No Model.) 6 Sheets—Sheet 5.
G. M. CLARK
DISK HARROW.
No. 444,662. Patented Jan. 13, 1891.
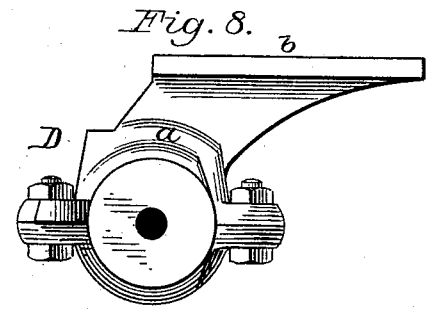
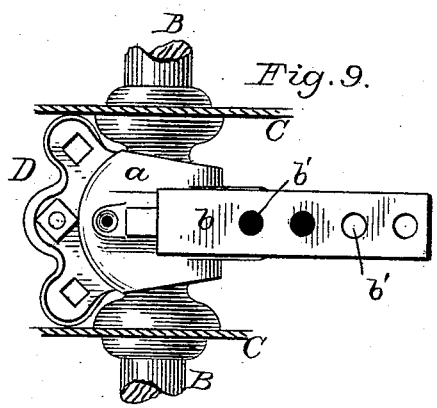
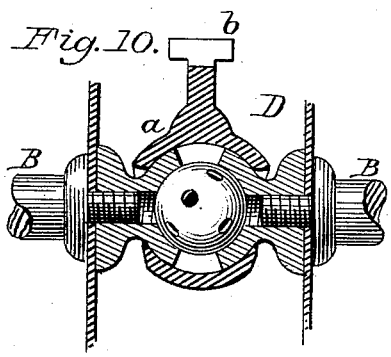
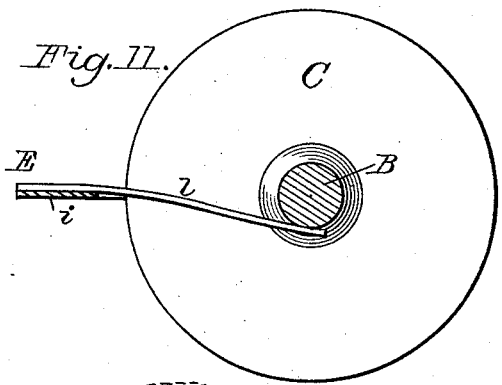
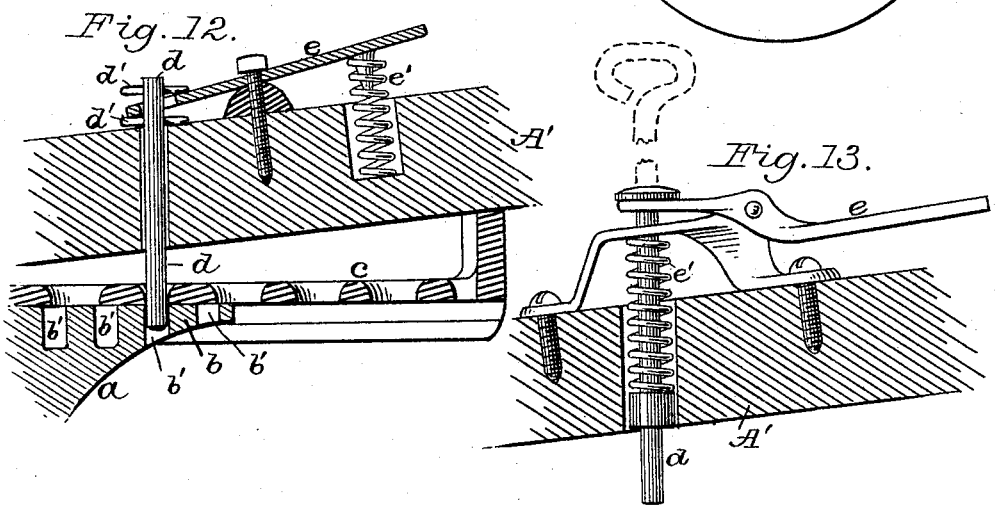
Witnesses
Philip F. Larner
Lowell Bartle
Inventor
George Marshall Clark
By his Attorney Wm C Wood (No Model.) 6 Sheets—Sheet 6.
G. M. CLARK.
DISK HARROW.
No. 444,662. Patented Jan. 13, 1891.
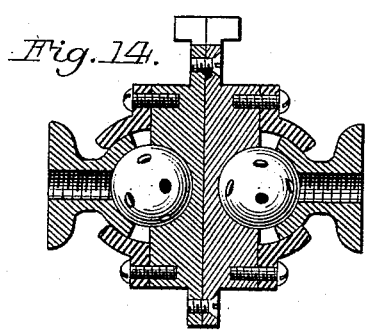
Fig. 14.
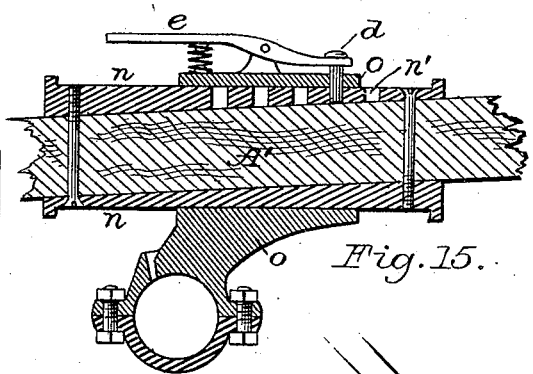
Fig. 15.
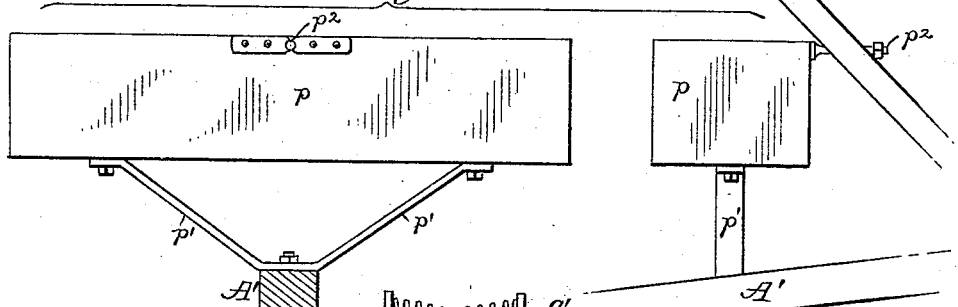
Fig. 16.
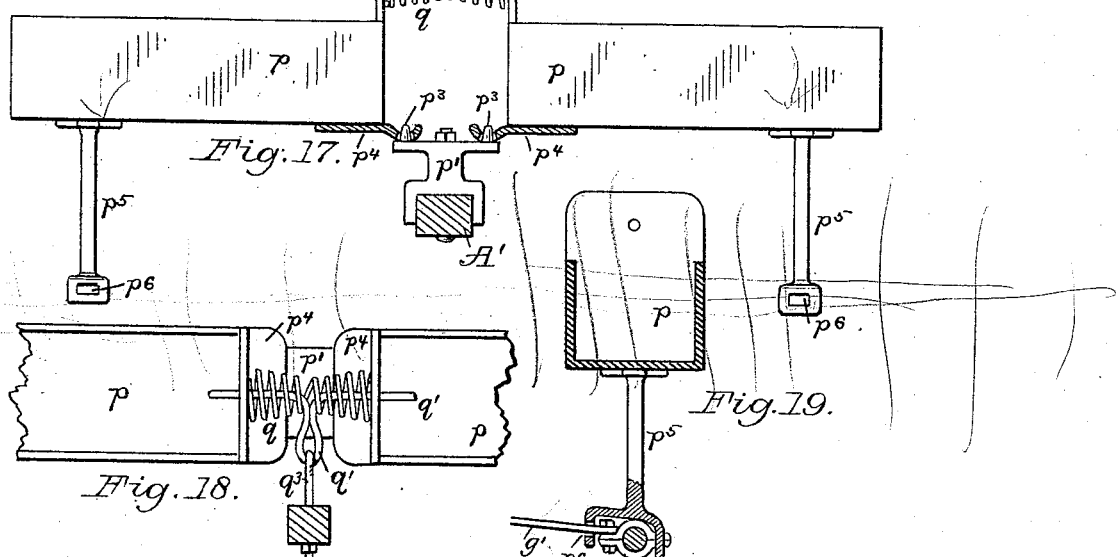
Fig. 17.
Fig. 18.
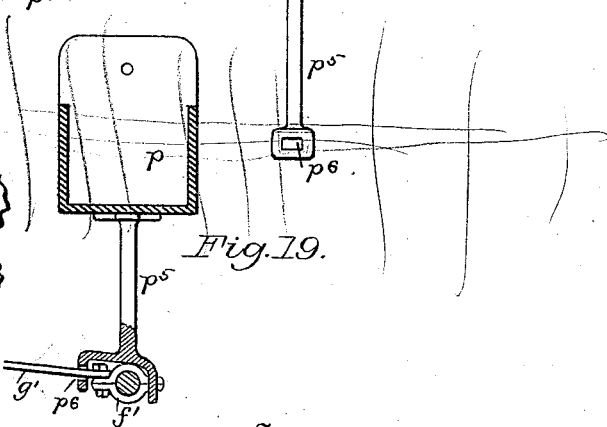
Fig. 19.
Witnesses
Philip F. Larner
Howell Bartle
Inventor
George Marshall Clark.
By his Attorney
Wm C Wood
THE NORRIS PETERS CO., PHOTO-LITHO., WASHINGTON, D. C.

UNITED STATES PATENT OFFICE.

GEORGE MARSHALL CLARK, OF HIGGANUM, TOWN OF HADDAM, CONNECTICUT.

DISK HARROW.

SPECIFICATION forming part of Letters Patent No. 444,662, dated January 13, 1891.

Application filed September 22, 1886. Serial No. 214,242. (No model.)

*To all whom it may concern:*

Be it known that I, GEORGE MARSHALL CLARK, of Higganum, in the town of Haddam, county of Middlesex, and State of Connecticut, have invented certain new and useful Improvements in Disk Harrows; and I do hereby declare that the following specification, taken in connection with the drawings furnished and forming a part thereof, is a clear, true, and complete description of the several features of my invention.

The prime object of my invention is to enhance the efficiency of this variety of harrows, and in doing this to greatly simplify their construction and reduce their cost, and also to render them specially convenient in use.

One feature of my invention involves the reduction of the matter of framing to what I believe to be a minimum as to material and cost of construction, the frame being a mere rearward extension of the pole, which for the first time, as I believe, is mounted upon and wholly supported upon the inner coincident ends of two separate revolving axles or shafts on which the gangs of disks are mounted, thus dispensing with gang-frames, whether of the overlying variety or of the yoke or fork form extending downward and rearward from the pole or a pole-frame, and bearing on said axles at points more or less remote from their inner ends. In other words, my harrow, as I believe, embodies for the first time the combination, with a pole, of what may be termed "frameless" revolving disk or cutter gangs hinged to the pole at their extreme inner ends and coupled to the pole by draft-rods. I control the outer ends of the revolving gang-shafts by means of bent draft-bars; but these are pivoted to the under side of the pole and serve to maintain the outer ends of the gang-shafts against rearward inclination, and for preventing undue upward inclination of said outer ends I employ a lateral bow-spring which normally bears lightly on said draft-bars, and while permitting said outer ends to fall in following undulations of the ground they cannot unduly rise, being resisted by the yielding pressure of said spring. This combination of the rearward extension of the pole mounted upon the coincident ends of the gang-shafts with said draft-bars and springs is, I believe, radically new, although it is not new to couple the inner ends of two gang-shafts together within a box by which said two shafts are flexibly connected, so as while in use to allow said inner ends to rise and fall and to vibrate to and fro independently of the pole-frame. In my harrow only the outer ends of the gang-shafts are movable while on duty, although I have provided for the adjustment of said inner ends with relation to the pole as for varying the inclination of the gang-shafts with reference to the line of draft. This novel mounting of the pole upon the inner ends of both revolving gang-shafts involved the devising of a novel journal-box, which in itself embodies certain features of invention set forth in my application for Letters Patent, filed September 3, 1886, Serial No. 212,613.

My journal-box in its preferred form is coupled to the pole in a novel manner, in that said box which contains the ends of both shafts, is provided with a tenon-block, which is fitted to slide longitudinally in a hanger, secured to the under side of the rear end of the pole, and it is provided with a catch controlled by the foot of the operator, so that the draft or the backing of the team performs all of the actual work in the adjustment of the gang-shafts with relation to the line of draft, the driver needing only to so operate the catch as to release and then confine said block within its hanger. It is not broadly new to thus cause the team to make said angular adjustments; but always heretofore links and hand-levers have either been employed as auxiliaries, or gang-frames in some forms have been used for coupling the disk-gangs to the pole, none of which devices are employed or needed in my organization.

I have referred to my novel journal-box; but it is to be understood that other forms of box may be employed without departure from those features of invention thus far referred to; but it is well known that in such harrows as have the convex sides of the disk toward the center of the machine and have the gang-shafts inclined forward from the center a heavy end-thrust is involved, each shaft being forced toward the others, and it is in such machines, as well as in any others having a corresponding end-thrust, that my novel journal-box possesses its greatest value. This end-thrust of the two shafts induces heavy friction, which others have sought to overcome by complex anti-friction bearings, involving a series of annularly-arranged balls operating in a vertical plane, surrounding each gang-shaft at some central or other point more or less remote from either end, and also by other forms of complex boxes, including globular sectional sleeves. Under this portion of my invention I can and do employ for intermediate bearings coupled to my draft-bars boxes of the cheapest simplest kind, because at the coincident inner ends of the disk-shaft there is interposed a single ball, which bears the thrust of both shafts, and, being free to revolve independently of both, is constantly presenting fresh surfaces for bearing contact, and thus I am enabled to maintain a perfect and durable thrust-bearing for both shafts, which operates under what I believe to be a minimum degree of friction and correspondingly reducing the heavy draft which has heretofore been strongly urged against disk harrows. It should be here stated that in disk harrows it is not new to provide in a journal-box a lubricating-chamber containing a series of loose washers against which the flat end of a gang-shaft is engaged with thrusting force; but heretofore such bearings were so constructed as to necessarily involve the use of gang-frames, each of which was pivoted centrally to permit both ends of the gang-shaft to rise and fall. Said washers could not well be used in a harrow organized like mine without being employed with more or less of the novel features of my central journal-box—as, for instance, by slicing up my ball into several washers, two of which would be flat on one side and convex on the other, and all used with the cup-shaped seats for receiving said outer or convex washers.

The presence of dust and earth adjacent to the bearings of a disk harrow render lubrication highly important, but quite difficult to accomplish, and hence I make the thrust-bearing balls hollow and perforate them, so that they can at the beginning of a season be filled with a solid lubricant, which will be duly yielded up to the bearing should it become unduly heated, either from severe duty or by neglect of the usual and proper oiling.

Another feature of my invention involves the use of a central turf-cutter pendent from the pole and in line with the center of the box, by which the two ends of the gang-shafts are coupled for the purpose of breaking up sod and earth on a line which cannot possibly be traversed by either of the disks at the inner ends of the gang-shafts and so displacing the soil that it may be placed within the scope of the two inner disks.

For working a central line of soil a leading-disk has heretofore been employed, and so, also, in combined seeders and harrows containing gang-frames and a central supporting-wheel an adjustable cultivator or harrow tooth has been employed in front of the wheel; but my turf-cutter differs from said other devices in that it is so formed and so set that when in use it cuts sod and turns the earth aside each way and places more or less of it under the working control of the inner disks, and also so that on striking any ordinary or usual obstacle said cutter will push it aside or override it.

The importance of keeping the disks free from adhering matter has prompted the devising of scrapers in large numbers, many of which have been practically employed with more or less desirable results. As a rule said prior scrapers have been so organized as to involve the use of gang-frames as essential accompaniments, and said gang-frames have permitted the scrapers to be adjustable, and they have been arranged both vertically and horizontally. I have organized adjustable scrapers and arranged them horizontally at the rear of the disks. In this connection I have devised various novel features, all contributing to efficiency and economy.

The pivoted draft-bars by which the pole is coupled to the gang-shafts are connected to the latter by their outer boxes, and hence said boxes cannot revolve, and I utilize said boxes as foundations on which to support the outer ends of the scraper-bars. The other or inner ends, however, have a support upon the central journal-box. Each scraper-bar being bolted to arms which are in turn bolted to said boxes is thereby rendered longitudinally adjustable, and hence scrapers inwardly projecting from said bar can be located in any desired position with relation to the concave faces of the disks.

It is well known that weeds, earth, and clods are liable to get wrapped around or adhered to the revolving gang-shafts between the disks, and this is prevented in my harrow, as I believe, for the first time. In this connection I have devised what I will term "clod-breakers," which extend from the scraper-bar beneath the axle, between the disks, and in proper relation to the convex sides of the disks, so that as clods and weeds rise beneath and at the rear of the gang-shaft they are arrested by said clod-breakers, and the latter, by extending beneath and being in close contact with the revolving gang-shaft, effectually prevent wrapping or balling on said shaft. This peculiar clod-breaking feature I deem broadly new, notwithstanding the prior use of a vertically-reciprocated clod-breaker beneath the driver's seat in front of the gangs. In such prior disk harrows as have had a scraper-bar at the rear of the disks there have been used horizontal supporting-arms or rearward extensions of the gang-frames on which said bar was mounted, and said arms occupy positions at least at two points in a gang, which generally correspond to the positions occupied by my clod-breakers, with which, however, said arms should not be confounded, either structurally or functionally, because I also employ horizontal supporting-arms between two of the disks in each gang; but these cannot prevent falling on the shaft, because at those points there is no revolving shaft exposed, the boxes being non-rotative and filling the entire space between the two adjacent disks, and corresponding conditions are present in said prior harrows.

It is well known that in nearly all two-gang disk harrows there is a general outward displacement of soil from the line of draft, and I believe I am the first to provide for an inward or replacing movement of the surface soil and at the same time pulverize and work said soil into a desirable surface condition. In reaching this end I employ drag-bars of novel construction and arrangement in that each disk-gang has its own bar so applied that the inclination of said bar to the line of draft always corresponds with or is greater than the inclination of the gang-shaft, and hence said bar levels and drags the surface soil toward the line of draft. In such disk harrows as induce an inward displacement of the surface soil my drag-bars, being so coupled to the gang-shafts as to assume corresponding inclinations, causes the surface soil to be replaced by an outward movement from the line of draft. This feature I deem broadly new, notwithstanding the prior use of a single straight drag-bar at the rear of and common to both gangs, and also of the prior use of toothed levelers at the rear of each gang and coupled to the gang-frames at a single point by means of a loose connection, and also of the prior use in harrows having inner disks, which by co-operative action develop a wide deep central furrow, of a short leveler at the rear of each of the two inner disks for filling up said specially wide and deep central furrow. In working with my harrow no such special furrow can be made, and I seek to work, and do actually work, the soil with my drag-bar differently from any other disk harrow known to me.

In working some soils weight-boxes are desirable, and I have provided therefor in a simple form and also in a more complex form which involves several novel features, through one of which the outer ends of the gang-shaft can be and are controlled by yielding pressure in preventing their undue lifting action while at work.

After fully describing the harrow illustrated in the drawings the features deemed novel will be specified in the several clauses of claims hereunto annexed.

Referring to said drawings, Figure 1 is a front view of said harrow with a portion of the pole and the doubletree removed. Fig. 2 is a top or plan view of the same with the driver's seat and its stand removed. Fig. 3 is a rear view of the machine. Fig. 4 is an end view of the harrow with one of its disk-gangs removed. Figs. 5, 6, and 7 in side, bottom, and lateral section illustrate the hanger by which the central journal-box is secured to the pole. Figs. 8, 9, and 10, in side and top views and in lateral vertical section, respectively illustrate my novel journal-box and coincident portions of the gang-shafts. Fig. 11 is a lateral section through a gang-shaft and a scraper-bar, illustrating one of my novel clod-breakers and its relations to said shaft. Fig. 12 is a sectional view illustrating a lever and catch by which the angular adjustment of the gang-shafts is maintained or a change permitted. Fig. 13 illustrates modifications of said lever and catch. Fig. 14 in section illustrates a journal-box wherein each shaft has its own ball, the latter being interposed between its own cup-shaped seat and the cup-shaped bearing on the shaft. Fig. 15 illustrates a portion of the central journal-box integral with its hanger and socketed to receive the pole. Fig. 16 illustrates my mode of applying a single weight-box to my harrow. Figs. 17, 18, and 19 illustrate, respectively in front, top, and lateral section, my mode of applying a separate weight-box for each gang. Fig. 20 illustrates one of my clod-breakers, as sometimes constructed by me, integral with a scraper.

As a rule, harrows of this class fitted for heavy service are provided with a pole A, and worked by a double team; but if made lighter thills may be employed, it then being only requisite that the thills be rigidly secured to a cross-bar and thereby to a tail-piece A', which in the machine shown is an integral rearward extension of the pole. The tail-piece A' constitutes the only portion of the machine which can be strictly termed a "frame," and it is supported at its rear end upon the coincident ends of the revolving shafts B, on which the disks C are mounted in gangs, which in ordinary machines are preferably six in number. The disks are mounted upon and are clamped to their shaft by means of collars, sleeves, and nuts in a manner old and well known. The journal-box D contains the inner or coincident ends of the revolving disk-shafts. The top $a$ of the box D is provided with a tenon-block $b$, which is fitted to slide longitudinally in a longitudinally-grooved hanger $c$, which is secured to and beneath the tail-piece by bolts $c'$ and $c^2$, the latter serving, also, as a bolt for securing the usual seat-step in place; but both perform the additional function of limiting the longitudinal movement of the tenon-block, and while this double use of said bolts involves economy and convenience other means may be employed for restricting the movement of said tenon-block without departure from my invention. Said hanger $c$ has its groove substantially horizontal, as distinguished from the usual downward inclination of the tail-piece, for enabling said tenon-block and hanger to slide freely with reference to each other when the pole at its outer end is elevated. The tenon-block $b$ is provided with a series of vertical holes $b'$, centrally arranged in a row, and in the tail-piece $A'$ there is a vertically-sliding locking bolt or catch $d$, the lower end of which is fitted to enter any one of the holes $b'$, or when said tenon-block and the box has been moved fully rearward said pin or bolt can drop in front of the front end of said block. So, also, does the catch-bolt drop at the rear of said block when the latter is moved fully forward. On top of the tail-piece is a lever $e$, having a central fulcrum, and at one end said lever has a hole loosely occupied by the upper end of said bolt between two transverse spring-pins $d'$. Beneath the opposite end of said lever there is an expansive spring $e'$, which normally forces the bolt downward. This lever may be provided with a push-rod extending upward within reach of the operator, as indicated in dotted lines in Fig. 4; or it may be in the form of a treadle-lever, as shown, to be operated by the heel of the operator; or said bolt may be encircled by an expansive spiral spring operated by a lever or by a pull-rod, both of which are illustrated in Fig. 13, it being understood that such details in construction and arrangement may be widely varied without departure from this portion of my invention, by means of which the coincident ends of the revolving disk or gang shafts are housed in one box, on which the pole is supported, and which is longitudinally adjustable in the line of draft, and is readily locked and unlocked in position for enabling a team to do all of the work of angularly adjusting the disk-shafts with relation to the line of draft.

On each gang-shaft there is a plain two-part box $f f'$, each preferably located in the second space between the disks near the outer end of the shaft, and each box is pivotally coupled to the pole tail-piece $A'$ by means of a pair of bent draw-bars $g g'$, a bolt $f^2$, and a bolt $g^2$, the latter, with a view to convenience and economy, being made to also serve as a bolt for the usual doubletree or evener, the bolt $f^2$ serving also to unite the two parts of the box $f$ or $f'$. For maintaining the outer ends of the gang-shafts in their normal depressed working positions I have introduced a novel feature, consisting of the crosswise bow-spring $h$, composed of heavy steel, and arranged at its outer ends to bear with yielding pressure upon the draw-bars $g g'$ and through them to bear upon the gang-shafts, the pivotal connection of the draw-bars with the pole permitting this action of the spring. This spring $h$ is centrally secured to the under side of the tail-piece $A'$ by means of a bolt $h'$, which for economy and convenience also serves to secure the front end of the usual seat-step, and said bolt still further serves to secure the evener-strap. The flat surfaces of the under side of the ends of the spring and the top of the underlying brace-bars afford good general contact, which is maintained throughout the variations in the positions of the brace-bars incident to the variations in the angular adjustment of the gang-shafts. As thus organized the weight of the pole and driver is directly borne by the inner ends of the revolving gang-shafts, at which point there is the greatest tendency of the disks to lift, and enough downward pressure is exerted by the spring at the outer boxes to always keep the outer disks down to their work, but permitting them to rise and fall in conforming to surface undulations.

At the rear of the disks of each gang, and substantially in line with the gang-shaft, there is a scraper E, which involves a number of novel features. Said scraper consists of a scraper-bar $i$ and a series of supporting-arms $i' i^2 i^3$, these being pivoted at their outer ends to the scraper-bar. At its inner end the arm $i'$ is bolted to the central journal-box D, and the arms $i^2$ and $i^3$ are similarly bolted to the outer journal-boxes $f f'$. As in many other instances, each of these bolts by which the arms are attached perform double duty, and in some cases treble duty. The scraper-bar is composed of flat steel, and so are the arms, and although the connections of the latter are pivot-bolts, the scraper-bar is securely maintained in a horizontal position laterally and longitudinally. Said scraper-bar has riveted thereto a series of scrapers $k, k', k^2, k^3$, and $k^4$, but a scraper $k^5$ is carried upon each arm $i^2$, and all of said scrapers enter into the concave sides of the disks. Said scraper-bar is provided for the first time with a series of clod-breakers $l$, there being four of these with each gang, and in their simplest form each is composed of a flat strip of thin steel riveted at one end to the top of the scraper-bar, and projected along the convex side of a disk, below the gang-shaft and bearing upwardly thereon, thus enabling the clod-breakers to perform a duty as braces for the scraper-bar, and enabling it to resist the upward strains incident to the scraping operation. As the disks in their operation turn up clods of earth and turf, they strike against the under sides of the clod-breakers, and are tumbled forward and sidewise, and thereby broken or disintegrated, and weeds, grass, and mud are also prevented from wrapping around and accumulating upon or balling the shaft between the disks. Said clod-breakers also enable the adjacent scrapers to operate more effectually by preventing undue balling between the disks beyond the inner ends of the scrapers. The extension of the clod-breakers beneath the gang-axles is so effective for preventing balling and wrapping on the axles that for obtaining still better results I also extend the scrapers beneath the axle, and enable them to prevent balling at the center of the disks as well as upon the shaft adjacent thereto, and for obtaining the very best results I also couple the scrapers and the clod-breakers beneath the axle, as illustrated in Fig. 20, thus protecting the rotary surface of the axle from engaging contact with weeds, grass, and roots. It will be seen that in a harrow of this so-called "frameless" type the scraper-bar affords the sole available support for the clod-breakers. At the rear of the two gangs of disks is the drag-bar F, constructed in two sections $m$ and $m'$, each gang having its own section. In its best form said drag-bar has its two sections hinged together at their inner ends, and it is coupled to the tail-piece by one central link $m^2$, bolted upon the box D, and by two other links $m^3$ $m^4$, each being secured to a box $f$ or $f'$ by one of the scraper-arm bolts, thus enabling these latter bolts to do treble duty. Drag-bars have heretofore been employed in wheel disk harrows; but they have always been straight rigid bars, whereas mine are constructed in sections, one for each gang of disks, so that each of said sections will always assume an angular adjustment corresponding to the angular adjustment of the gangs of disks. The surface soil with a harrow thus organized is moved more or less outwardly or away from the line of draft by the disks; but the drag-bar sections, being inclined like the disk-gangs to the line of draft, as described, cause the surface soil to be replaced toward the central or outside, as the case may be, thus evening up the surface and reworking the soil in a manner highly conducive to complete pulverization.

I have noted the numerous instances in which bolts have been made to perform several duties each, and while it is to be understood that said minor features of construction do not essentially enter into my invention, it must be seen that they contribute materially to the economic production of my harrow, involving, as they do, not only a saving of material, but also much labor in construction and in assembling the parts, and it will be obvious that these economic results have been rendered possible through the main features of my invention.

A weight-box $p$ in its simplest form can be applied to my harrow, as illustrated in Fig. 16, wherein a standard $p'$, composed, preferably, of bent plate-iron is shown to be bolted to the top of the tail-piece and affording a bearing on top for the reception of the weight-box, which is bolted thereon and braced by a bolt $p^2$, coupled to the usual wooden seat-stand. In this case one weight-box serves for both gangs of disks; but for working some soils it is deemed best for each gang to have its separate weight-box, as illustrated in Figs. 17, 18, and 19, wherein the standard $p'$ is mounted, as before, on the tail-piece A'; but it is provided with bearing-surfaces on top and two vertical studs $p^3$. Each weight-box $p$ has a projecting bottom plate $p^4$ at the inner end, which is perforated to receive one of said standard studs. At or near the outer end of the box it has a pendent leg $p^5$, forked at the bottom so as to straddle and bear upon one of the boxes $f f'$, and at the front side of the fork there is a lateral slot $p^6$, which is occupied by a drag-bar $g$ or $g'$, thus affording to said box a reliable support, and, as thus far described, said boxes can be depended upon for good service; but I have so constructed them that they can and do co-operate with a spring $q$ and produce results similar to those incident to the use of the bow-spring $h$, before described. The two inner ends of the boxes are extended upwardly to afford leverage, and each end, near its top, is centrally perforated for the free reception of a T-shaped bolt $q'$, the head or cross bar of which is encircled by a heavy expansive spiral spring $q$, having end-bearings against the two coincident ends of the boxes so as to normally force their outer ends downward upon the gang-shafts, and thus control the latter with a yielding pressure conducive to good results in working the soil. The shank of the bolt $q'$ is coupled by a link $q^3$ to the seat-stand, thus securing the inner ends of both boxes in position without interfering with their proper freedom of movement.

Now, while I prefer to embody all the features of my invention in one harrow, it will be obvious that some of said features may be separately employed in disk harrows otherwise differently organized, and it is to be distinctly understood that while I have tested the harrow constructed as shown, and with highly satisfactory results, I am aware that many variations can be made without seriously impairing its value, and without substantial departure from my invention. As, for instance, the thrust journal-box may contain two balls, one for each shaft, as illustrated in Fig. 14, and also without departure from those portions of my invention which relate to mounting and supporting the pole upon the inner ends of the revolving gang-shafts by means of a hanger and a box which couples the coincident ends of said shafts together, it being further obvious that said box thus coupled to the pole might only contain balls on the inner ends of said shafts, as has heretofore been the case in harrows having gang-frames on which the pole and its frame have been mounted, said prior gang-shafts having been flexibly joined by said ball-and-socket joints, which served as mere couplings for flexibly connecting the inner ends of said gang-shaft, so that said inner ends could freely rise and fall independently of the pole-frame, as was absolutely essential in said prior harrows. Again, while I know the practical value of the grooved hanger below the pole and of the central journal-box sliding in said hanger, I am aware that a corresponding coupling of the box to the pole and a corresponding capacity for independent longitudinal movement of said box can be provided for by making a portion of the box and the hanger integrally, as illustrated in Fig. 15, wherein two plates $n$ are bolted to the top and bottom of the pole tail-piece A' for securing a horizontal plane, and the upper part of the box is integral with a hanger $o$, which has a longitudinal socket or hole occupied jointly by the tail-piece and the two plates $n$, but so that the pole can slide to and fro in said hanger. The upper plate $n$ has holes $n'$, and on top of the hanger is the foot-lever $e$ and catch or locking-bolt $d$, in no substantial way differing from that already described.

Having thus described my invention, I claim as new and desire to secure by Letters Patent—

1. The combination, substantially as hereinbefore described, of the two disk-shafts and their disks, the pole having a rearward extension above the inner or coincident ends of said shafts and mounted thereon, and draft-rods pivoted to the pole and coupled to said shafts.

2. The combination, substantially as hereinbefore described, of the two disk-shafts and their disks, the pole having a rearward extension and mounted upon the inner ends of said shafts, a draft-rod extending from the pole to each shaft, and a lateral spring overlying both of said draft-rods and bearing thereon.

3. The combination, substantially as hereinbefore described, of the pole having a rearward extension or tail-piece, a pair of disk-gang shafts, a journal-box common to both of said shafts at their inner ends, beneath and supporting said tail-piece, but free to move longitudinally thereon, and a catch for confining said tail-piece against longitudinal movement independently of said box and for releasing the same in making angular adjustments of the gang-shafts with relation to the line of draft.

4. The combination, substantially as hereinbefore described, of the pole having a rearward extension, a hanger attached to said pole, the two disk-shafts coupled at their inner ends by a box sliding longitudinally in said hanger, and a catch for confining said box at any desired point in said hanger and for releasing the same during the angular adjustment of said shafts by a forward or a backward movement of the pole.

5. In a disk harrow, the combination of a gang-shaft provided with a cup-shaped bearing at its inner end, a journal-box at its inner end, and a ball within said box engaged by said cup-shaped bearing for receiving the end-thrust of said shaft and capable of rotation with and independently of said shaft, substantially as described.

6. In a disk harrow, the combination of the two gang-shafts, a box coupling their inner ends, and a single ball interposed between the ends of said shafts and capable of rotation with and independently of both of said shafts, substantially as described.

7. In a disk harrow, the combination, with the disk or gang shafts, of an end-thrust box containing a hollow perforated ball, substantially as described, whereby a chamber is afforded within said ball for the reception of a solid lubricant, which will be yielded to the bearing when heated as a result of heavy service, or non-lubrication by oiling, because of the closure of oiling-apertures by dust and earth.

8. In a disk harrow, the combination of two gangs of disks and their shafts, coupled together by a box at their inner ends, a pole overlying said box, and a turf-cutter pendent from said pole in line with said box and rigidly set as against rearward deflection, and having a cutting-edge rounded outwardly in a vertical plane and also having sides rearwardly flaring toward the two inner disks on the gang-shafts, substantially as described, whereby sod may be cut and earth in the line of the connected ends of the gang-shafts placed within the influence of the two inner disks, and also whereby said turf-cutter may override ordinary obstacles.

9. The combination of the pole, a series of disks and their gang-shaft, a central journal-box secured to the pole for one end of said shaft, an outer journal-box near the outer end of said shaft and pivotally coupled to said pole by a draft-bar, a scraper-bar at the rear of the disks supported on arms projecting rearwardly from said two boxes, and a series of scrapers on said scraper-bar.

10. In a disk harrow, the combination, substantially as hereinbefore described, of a gang of disks, its shaft, its journal-boxes and arms, and a series of clod-breakers extending from below and in contact with said shaft and between the disks to a suitable support upon an adjacent portion of the harrow.

11. The combination, with the disks, a gang-shaft, and a scraper-bar, of a series of clod-breakers extending from said bar to and in contact with said shaft between the disks, substantially as described, whereby clods are broken and grass and weeds prevented from balling on said shaft.

12. The combination of a gang of disks and its shaft, a horizontal scraper-bar, and a scraper extended along the concave side of each disk and beneath the shaft, substantially as described.

13. The combination of a gang of disks and its shaft, a horizontal scraper-bar, a scraper extended along the concave side of a disk and beneath the shaft, and a clod-breaker extending from said bar along the convex side of a disk beneath the axle and thence longitudinally to said scraper, as and for the purposes specified.

14. The combination, substantially as hereinbefore described, of the disk-gangs and their shafts and a drag-bar at the rear of each gang of disks, coupled with their shaft and adjustable with relation to the line of draft to angles corresponding to the adjustment of the gang-shaft behind which it is located.

15. The combination, with the angularly-adjustable gang-shafts and their disks, of the drag-bar constructed in sections jointed centrally against rearward movement and each coupled near its outer end to the corresponding gang-shaft, substantially as hereinbefore described.

16. The combination, with the two disk-gangs and their shafts and the tail-piece of the pole, of a weight-box for each gang of disks, flexibly supported at one end on said tail-piece and at the other end upon a box on the gang-shaft, substantially as described.

17. The combination, with the two disk-gangs, their shafts, and the pole tail-piece, of the two weight-boxes, each over a gang-shaft and supported upon said tail-piece and on a box on said shaft, and a spring above said tail-piece, between the coincident ends of said boxes, for forcing their outer ends downward upon said shafts with yielding pressure, substantially as described.

18. In a harrow, the combination, substantially as hereinbefore described, of a pole, frameless revolving disk or cutter gangs, hinged to the pole at their extreme inner ends, and draft-rods attached to said pole and gangs.

GEORGE MARSHALL CLARK.

Witnesses:
PHILIP F. LARNER,
WM. C. WOOD.